United States Patent
Chukka et al.

(10) Patent No.: US 10,033,608 B1
(45) Date of Patent: *Jul. 24, 2018

(54) NETWORK INTERFACE PORT MANAGEMENT

(71) Applicant: International Business Machines Corporation, Armonk, NY (US)

(72) Inventors: Madan K. Chukka, Hyderabad (IN); Srikanth Kondapaneni, Hyderabad (IN); Harikrishna Manchineni, Vijayawada (IN); Bharath Shankar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,987

(22) Filed: Jan. 18, 2018

Related U.S. Application Data (63) Continuation of application No. 15/708,198, filed on Sep. 19, 2017, which is a continuation of application No. 15/413,394, filed on Jan. 23, 2017.

(51) Int. Cl.
*H04L 12/26* (2006.01)

(52) U.S. Cl.
CPC .......... *H04L 43/0841* (2013.01); *H04L 43/12* (2013.01)

(58) Field of Classification Search
CPC ............... H04L 43/028; H04L 43/0841; H04L 43/0829; H04L 43/10; H04L 43/12; H04L 49/90

See application file for complete search history.

(56) References Cited

U.S. PATENT DOCUMENTS

| | | | |
|---|---|---|---|
| 6,272,113 | B1 | 8/2001 | McIntyre et al. |
| 7,936,770 | B1 | 5/2011 | Frattura et al. |
| 9,344,328 | B1 | 5/2016 | Bishara |
| 2007/0255819 | A1 | 11/2007 | Hua et al. |
| 2011/0167119 | A1 | 7/2011 | Wan et al. |
| 2014/0119203 | A1 | 5/2014 | Sundaram et al. |
| 2015/0078394 | A1 | 3/2015 | McKenney |
| 2016/0285750 | A1 | 9/2016 | Saquib et al. |
| 2017/0187569 | A1 | 6/2017 | Shiraki |

OTHER PUBLICATIONS

Hoffman, Chris; "What's the Difference Between TCP and UDP?"; How to Geek; <http://www.howtogeek.com/190014/htg-explains-what-is-the-difference-between-tcp-and-udp/>; Jun. 1, 2014, 4 pages.

(Continued)

*Primary Examiner* — Paul H Masur
(74) *Attorney, Agent, or Firm* — Peter J. Edwards (57) ABSTRACT

Disclosed aspects relate to network interface port management pertaining to a set of queues of a physical port of a client physical machine. A set of echo packets may be transmitted from the client physical machine to a server physical machine. The set of queues of the physical port of the client physical machine may be monitored with respect to an expected return of the set of echo packets. A triggering event related to the expected return of the set of echo packets may be detected with respect to the set of queues of the physical port of the client physical machine. A wellness indication pertaining to the set of queues of the physical port of the client physical machine may be determined based on a nature of the triggering event.

1 Claim, 5 Drawing Sheets

(56) References Cited

OTHER PUBLICATIONS

Chukka et al., "Network Interface Port Management", U.S. Appl. No. 15/413,394, filed Jan. 23, 2017.
Chukka et al., "Network Interface Port Management", U.S. Appl. No. 15/708,198, filed Sep. 19, 2017.
Accelerated Examination Support Document, U.S. Appl. No. 15/708,198, dated Sep. 18, 2017, 15 pgs.
Chukka et al., "Network Interface Port Management", U.S. Appl. No. 15/874,006, filed Jan. 18, 2018.
Accelerated Examination Support Document, U.S. Appl. No. 15/874,006, filed Jan. 12, 2018, 20 pgs.
IBM, List of IBM Patents or Patent Applications Treated as Related, Jan. 11, 2018, 2 pages.

NETWORK INTERFACE PORT MANAGEMENT

BACKGROUND

This disclosure relates generally to computer systems and, more particularly, relates to network interface port management pertaining to a set of queues of a physical port of a client physical machine. Network interface ports may be used to send or receive data. The amount of data being sent and received is increasing. As the amount of data being sent and received increases, the need for network interface port management may also increase.

SUMMARY

Aspects of the disclosure relate to network interface port management pertaining to a set of queues of a physical port of a client physical machine. A set of data packets may be transmitted using a number of queues of a physical port. The set of data packets may be sent from a client physical machine to an echo server running on a different machine configured to return the set of data packets back to the client physical machine. An expected client port value may be computed and compared with the port value of a received data packet to verify that the data packet was echoed/returned from server to client and has been received through an expected queue in the physical port. Accordingly, based on the reception status of the set of data packets, the operational status of one or more queues of the physical port may be determined.

Disclosed aspects relate to network interface port management pertaining to a set of queues of a physical port of a client physical machine. A set of echo packets may be transmitted from the client physical machine to a server physical machine. The set of queues of the physical port of the client physical machine may be monitored with respect to an expected return of the set of echo packets. A triggering event related to the expected return of the set of echo packets may be detected with respect to the set of queues of the physical port of the client physical machine. A wellness indication pertaining to the set of queues of the physical port of the client physical machine may be determined based on a nature of the triggering event.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to network interface port management pertaining to a set of queues of a physical port of a client physical machine. A set of data packets (e.g., UDP/TCP packets) may be transmitted using a number of queues (e.g., RSS queues, TSS queues) of a physical port. The set of data packets may be sent from a client physical machine to an echo server running on a different machine configured to return the set of data packets back to the client physical machine. An expected client port value may be computed and compared with the port value of a received data packet to verify that the data packet was echoed/returned from server to client and has been received through an expected queue in the physical port. Accordingly, based on the reception status of the set of data packets, the operational status of one or more queues of the physical port may be determined (e.g., to identify malfunctioning queues). Leveraging data packet balancing techniques with respect to network interface port management may be associated with error detection, data traffic communication reliability, and network performance.

In some computer network environments, network nodes may make use of one or more queues to buffer network data traffic received by a physical port from other nodes within the network environment. Aspects of the disclosure relate to the recognition that, in some situations, network data traffic may be received by a network device using a single queue per physical port, such that in the event of a failure, malfunction, or other irregularity with respect to a physical port, it may not be known which queue is associated with the error event (e.g., errors are detected on a port-level basis, such that the operational status/health of particular queues is not diagnosed). Accordingly, aspects of the disclosure relate to balancing network data traffic over a plurality of queues per port, and using a set of echo packets to evaluate the wellness of each queue on a physical port. As such, the operational status of ports may be assessed on a queue-level basis, and data traffic may be managed to facilitate efficient data communication within computer network environments.

Aspects of the disclosure relate to a system, method, and computer program product for network interface port management pertaining to a set of queues of a physical port of a client physical machine. A set of echo packets may be transmitted from the client physical machine to a server physical machine. The set of queues of the physical port of the client physical machine may be monitored with respect to an expected return of the set of echo packets. A triggering event related to the expected return of the set of echo packets may be detected with respect to the set of queues of the physical port of the client physical machine. A wellness indication pertaining to the set of queues of the physical port of the client physical machine may be determined based on a nature of the triggering event.

In embodiments, the set of queues may be structured to include a set of Receive Side Scaling (RSS) queues or a set of transmit side scaling (TSS) queues. In embodiments, the set of echo packets may be structured to include a set of User Datagram Protocol (UDP) or Transmission Control Protocol (TCP) packets. In embodiments, the set of echo packets may be received by the set of queues of the physical port of the client physical machine. It may be identified that the nature of the triggering event indicates that the set of echo packets has returned. Based on the nature of the triggering event indicating that the set of echo packets has returned, it may be determined that the wellness indication indicates that the set of queues of the physical port of the client physical machine is fit for a set of data traffic. The set of data traffic may be routed via the set of queues of the physical port of the client physical machine to process the set of data traffic. In embodiments, the set of data traffic may be routed via a set of other queues of the physical port of the client physical machine to process the set of data traffic. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Figure 1:
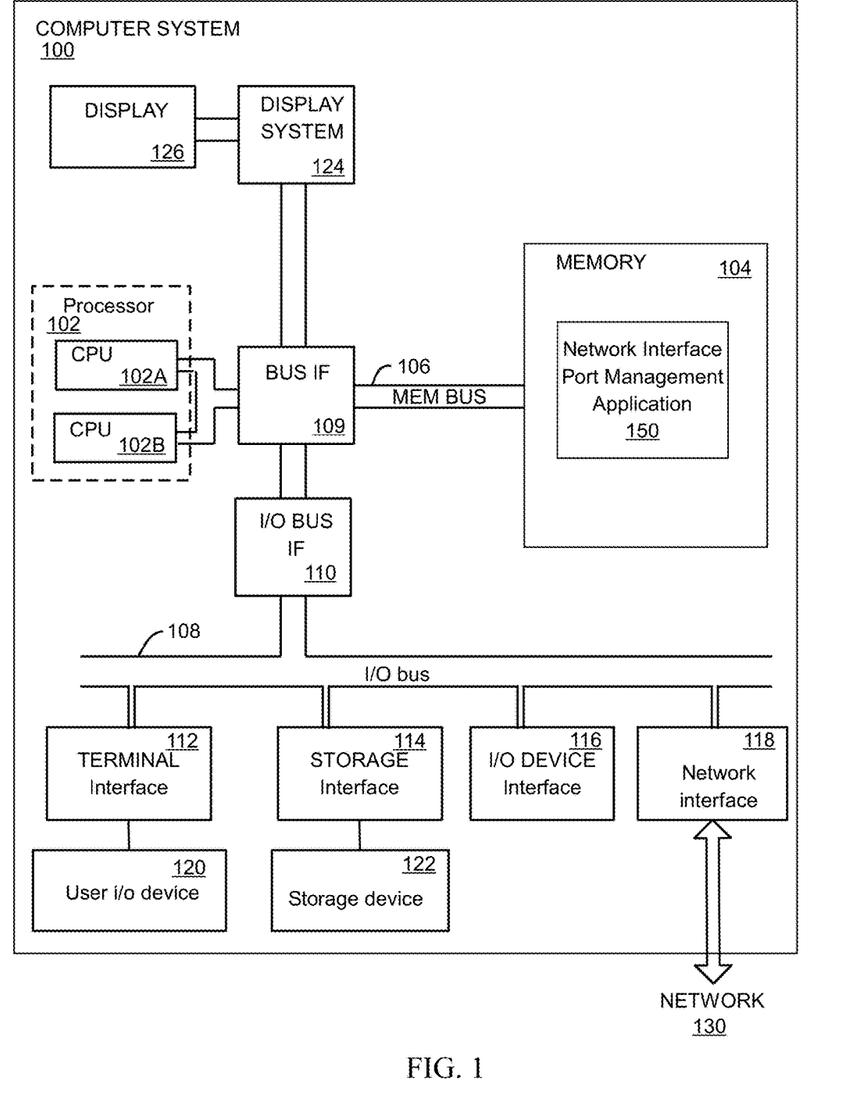
FIG. 1 depicts a high-level block diagram of a computer system for implementing various embodiments of the present disclosure, according to embodiments.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a network interface port management application 150. In embodiments, the network interface port management application 150 may include instructions or statements that execute on the processor 102 or instructions or statements that are interpreted by instructions or statements that execute on the processor 102 to carry out the functions as further described below. In certain embodiments, the network interface port management application 150 is implemented in hardware via semiconductor devices, chips, logical gates, circuits, circuit cards, and/or other physical hardware devices in lieu of, or in addition to, a processor-based system. In embodiments, the network interface port management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
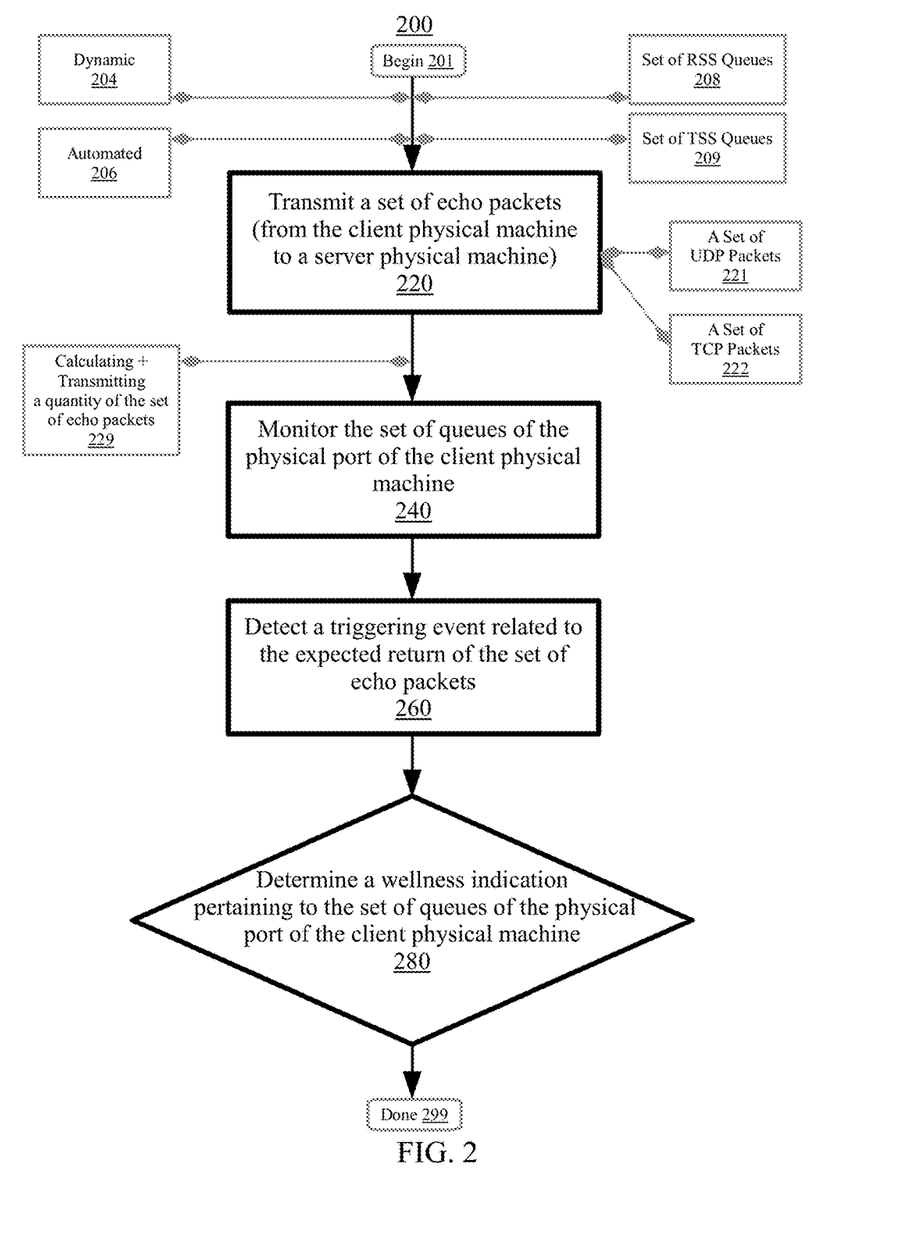
FIG. 2 is a flowchart illustrating a method of network interface port management pertaining to a set of queues of a physical port of a client physical machine, according to embodiments.

FIG. 2 is a flowchart illustrating a method 200 of network interface port management pertaining to a set of queues of a physical port of a client physical machine. Aspects of FIG. 2 relate to determining a wellness indication pertaining to a set of queues of a physical port of a client physical machine based on a nature of a triggering event related to an expected return of a set of echo packets. The physical port may include an interface for communication between a client physical machine (e.g., computer device, node, or server configured to receive/request a service) and other computers or peripheral devices of a network (e.g., station/server side device). The physical port may be configured to send and receive data traffic using a set of queues. As an example, the physical port may include a port of a network-interface card (NIC). The set of queues may include data structures (e.g., portion of memory) configured for temporary storage or buffering of data. For instance, the set of queues may be configured to receive and buffer a set of network data traffic on a physical port. Aspects of the disclosure relate to the recognition that, in some situations, data traffic is received by a network device using a single queue per physical port, such that in the event of a failure, malfunction, or other irregularity with respect to a physical port, it may not be known which queue is associated with the error event (e.g., errors are detected on a port-level basis, such that the operational status/health of particular queues is not diagnosed). Accordingly, aspects of the disclosure relate to balancing network data traffic over a plurality of queues per port, and using a set of echo packets to evaluate the wellness of each queue on a physical port. As such, malfunctions with respect to particular queues may be identified, and actions may be taken to facilitate data traffic transmission within the network environment. Altogether, leveraging data packet balancing techniques with respect to network interface port management may be associated with error detection, data traffic communication reliability, and network performance. The method 200 may begin at block 201.

In embodiments, the transmitting, the monitoring, the detecting, the determining, and the other steps described herein may each occur in a dynamic fashion to streamline network interface port management at block 204. For instance, the transmitting, the monitoring, the detecting, the determining, and the other steps described herein may occur in real-time, ongoing, or on-the-fly. As an example, one or more steps described herein may be performed in an ongoing fashion (e.g., a set of echo packets may be continuously/periodically transmitted from a client physical machine to a server physical machine to evaluate queue functionality/operability) in order to streamline (e.g., facilitate, promote, enhance) hardware connection management. Other methods of performing the steps described herein are also possible.

In embodiments, the transmitting, the monitoring, the detecting, the determining, and the other steps described herein may each occur in an automated fashion without user intervention at block 206. In embodiments, the transmitting, the monitoring, the detecting, the determining, and the other steps described herein may be carried out by an internal network interface port management module maintained in a persistent storage device of a local computing device (e.g., network node). In embodiments, the transmitting, the monitoring, the detecting, the determining, and the other steps described herein may be carried out by an external network interface port management module hosted by a remote computing device or server (e.g., server accessible via a subscription, usage-based, or other service model). In this way, aspects of network interface port management may be performed using automated computing machinery without manual action. Other methods of performing the steps described herein are also possible.

In embodiments, the set of queues may be structured to include a set of Receive Side Scaling (RSS) queues at block 208. Generally, structuring can include utilizing, incorporating, programming, setting-up, assembling, arranging, constructing, or otherwise configuring the set of queues to include the set of RSS queues. The set of RSS queues may include buffers configured to balance network data traffic from a network adapter across multiple queues (e.g., of multiple CPUs). The set of RSS queues may enable packets from a single network adapter to be processed in parallel on multiple CPUs while preserving in-order delivery to connections. In certain embodiments, the set of RSS queues may be configured for dynamic load balancing, secure hashing mechanisms, parallel interrupts, and the like. In embodiments, structuring the set of queues may include assigning one or more RSS queues to each CPU of the client physical machine. As an example, with respect to a client physical machine having 4 CPUs, the set of queues may be structured such that at least one RSS queue corresponds to each CPU of the 4 CPUs. In response to receiving a set of data traffic, the set of data traffic may be divided (e.g., balanced) across the set of RSS queues, and processed in parallel by the 4 CPUs. In embodiments, the set of queues may be structured to include a set of Transmit Side Scaling TSS) queues at block 209. Generally, structuring can include utilizing, incorporating, programming, setting-up, assembling, arranging, constructing, or otherwise configuring the set of queues to include the set of TSS queues. The set of TSS queues may include buffers configured for temporary storage of data traffic on a transmission-side network device (e.g., client physical machine, server physical machine). The set of TSS queues may hold data traffic until a receiving-side network device is ready to accept delivery of the data traffic. In certain embodiments, the set of TSS queues may be configured to divide the data traffic into one or more subsets prior to transmission, and route each subset to a different CPU of the receiving-side network device. Other methods of structuring the set of queues to include a set of RSS queues or a set of TSS queues are also possible.

At block 220, a set of echo packets may be transmitted from the client physical machine to a server physical machine. Generally, transmitting can include sending, conducting, conveying, directing, relaying, transferring, routing, or otherwise communicating the set of echo packets from the client physical machine to the server physical machine. The set of echo packets may include units of data that are configured to return to the source or point of origination from which they were transmitted (e.g., after being processed/routed by one or more intermediary network nodes). In embodiments, the set of echo packets may include an echo command that instructs a receiving device (e.g., server physical machine) to route the set of echo packets directly back to an origination device (e.g., client physical machine), or through one or more other intermediary network nodes before ultimately being delivered back to the origination device. As described herein, the set of echo packets may transmitted from a client physical machine to a server physical machine. The client physical machine may include a computer device, node, or server configured to receive/request a service from another network node (e.g., server device). The server physical machine may include a computer device or node configured to provide a function, specified set of data, or service to a client device. In embodiments, transmitting the set of echo packets may include assigning a source address (e.g., corresponding to the client physical machine) and a destination address (e.g., corresponding to the server physical machine), and routing the set of echo packets to the destination address of the server physical machine using one or more transmission protocols (e.g., User Datagram Protocol or Transmission Control Protocol). In embodiments, transmitting may include utilizing a hashing technique (e.g., network interface controller hash, Toeplitz hash algorithm) to generate a unique hash value for the set of echo packets transmitted from each queue (e.g., based on the client port number). For instance, for a physical port having 3 queues A, B, and C, a hash value may be calculated and assigned to a subset of the set of echo packets sent from each queue (e.g., such that echo packets sent from queues A, B, and C have different hash values with respect to one another to identify the queue from which they were transmitted). Other methods of transmitting the set of echo packets from the client physical machine to the server physical machine are also possible.

In embodiments, the set of echo packets may be structured to include a set of User Datagram Protocol (UDP) packets at block 221. Generally, structuring can include formulating, instructing, programming, setting-up, assembling, organizing, constructing, or otherwise configuring the set of echo packets to include the set of UDP packets. Aspects of the disclosure relate to the recognition that, in some situations, it may be desirable to transmit the set of echo packets at a known frequency, and without a pre-established connection between the client physical machine and the server physical machine (e.g., to facilitate data packet tracking). Accordingly, in embodiments, the set of echo packets may be structured to include a set of UDP packets. The set of UDP packets may include data packets configured for low-latency transmission to a receiving device without the need for an established link between the sending and receiving devices. In embodiments, structuring the set of echo packets to include the set of UDP packets may include configuring a network adapter (e.g., NIC of the client physical machine) to format the set of echo packets based on UDP, and subsequently route the set of echo packets to the server physical machine. As an example, a set of echo packets may be transferred according to UDP, such that the entire set of echo packets is sent at once at a known time of 2:41 PM (e.g., such that the time and number of packets transmitted may be recorded). Other methods of structuring the set of echo packets to include the set of UDP packets are also possible.

In embodiments, the set of echo packets may be structured to include a set of Transmission Control Protocol (TCP) packets at block 222. Generally, structuring can include formulating, instructing, programming, setting-up, assembling, arranging, organizing, constructing, or otherwise configuring the set of echo packets to include the set of TCP packets. Aspects of the disclosure relate to the recognition that, in some situations, it may be desirable to transmit the set of echo packets in a series of portions (e.g., individual packets), and verify whether each portion was received by a destination device (e.g., to check for lost packets). Accordingly, in embodiments, the set of echo packets may be structured to include the set of TCP packets. The set of TCP packets may include data packets configured for reliable, ordered, and error-checked delivery to a destination device. In embodiments, structuring the set of echo packets to include the set of TCP packets may include configuring a network adapter (e.g., NIC of the client physical machine) to format the set of echo packets based on TCP, and subsequently route the set of echo packets to the server physical machine in one or more subsets (e.g., groups, divisions, or portions of the set of echo packets). As an example, a set of echo packets may be transferred according to TCP via an established connection between the client physical machine and the server physical machine such that the server physical machine may verify arrival of each individual echo packet as it is received. Other methods of structuring the set of echo packets to include the set of TCP packets are also possible.

In embodiments, calculating and transmitting may occur at block 229. A quantity of the set of echo packets may be calculated based on a quantity of the set of queues configured on the physical port. At least the quantity of the set of echo packets may be transmitted. Aspects of the disclosure relate to the recognition that, in certain embodiments, the number of echo packets to be transmitted may be calculated based on the number of queues in the set of queues. Generally, calculating can include formulating, estimating, quantifying, counting, measuring, or otherwise computing the quantity of the set of echo packets based on the quantity of the set of queues. The quantity of the set of echo packets may include an absolute value for the number of echo packets (e.g., 500 echo packets), an aggregate data size for the set of echo packets (e.g., echo packets totaling 100 megabytes of data), or other quantitative indication of the amount of the set of echo packets. In embodiments, calculating the quantity of the set of echo packets may include ascertaining a quantity of the set of queues (e.g., number, amount), and assigning at least one echo packet to each queue of the set of queues. For instance, for a physical port having a set of 4 queues, each queue may be assigned at least one echo packet. As another example, in certain embodiments, each of the 4 queues may be assigned 50 echo packets (e.g., for a total of 200 echo packets across the 4 queues). In embodiments, calculating the quantity of the set of echo packets may include ascertaining an expected packet loss rate (e.g., based on an analysis of historical transmission data), and computing a number of echo packets for transmission based on the expected packet loss rate (e.g., such that a desired number of echo packets are expected to reach the destination despite packet loss). In embodiments, at least the quantity of the set of echo packets may be transmitted. Generally, transmitting can include sending, conducting, conveying, directing, relaying, transferring, routing, or otherwise communicating at least the quantity of the set of echo packets. In embodiments, as described herein, transmitting may include formatting the set of echo packets with a source address and a destination address, and routing them from the client physical machine to the server physical machine. Other methods of calculating the quantity of the set of echo packets and transmitting at least the quantity of the set of echo packets are also possible.

At block 240, the set of queues of the physical port of the client physical machine may be monitored with respect to an expected return of the set of echo packets. Generally, monitoring can include observing, overseeing, auditing, supervising, scanning, or otherwise tracking the set of queues of the physical port of the client physical machine with respect to an expected return of the set of echo packets. In embodiments, monitoring the set of queues with respect to an expected return of the set of echo packets may include scanning the physical port of the client physical machine to determine whether one or more of the set of echo packets has returned to the client physical machine. Monitoring the set of queues may include utilizing a network data diagnostic tool to analyze each data packet that arrives at the physical port of the client physical machine to determine whether or not it is an echo packet. For instance, in certain embodiments, the network data diagnostic tool may parse each data packet to ascertain whether the data packet includes an echo command (e.g., identifying it as an echo packet). In embodiments, monitoring the set of queues may include configuring each queue of the set of queues to automatically scan incoming traffic for data packets that include the echo command. Other methods of monitoring the set of queues of the physical port of the client physical machine with respect to an expected return of the set of echo packets are also possible.

At block 260, a triggering event related to the expected return of the set of echo packets may be detected with respect to the set of queues of the physical port of the client physical machine. In embodiments, detecting can include sensing, recognizing, discovering, distinguishing, ascertaining, or otherwise determining the triggering event related to the expected return of the set of echo packets. The triggering event may include a happening, incident, or other occurrence (e.g., with respect to the set of echo packets) that, when achieved, indicates a return status for the set of echo packets. As examples, the triggering event may include a temporal trigger (e.g., elapsing of a time period), an action-based trigger (e.g., packet reception, packet transmission), a threshold-based trigger (e.g., received echo packet count), a notification trigger (e.g., communication from an administrator/server physical machine), or the like. For instance, the triggering event may include a determination that a received data packet includes an echo command (e.g., indicating that at least a portion of the set of echo packets have returned to the client physical machine). In certain embodiments, the triggering event may include a temporal threshold (e.g., 120 seconds, 4 minutes), such that if the temporal threshold elapses without the set of echo packets returning, it may be determined that the set of echo packets may not return (e.g., they encountered an error, were lost as a result of a malfunctioning queue). In embodiments, detecting the triggering event with respect to the expected return of the set of echo packets may include examining received data packets with respect to a set of triggering criteria (e.g., parameters, conditions, or thresholds that define the triggering event), and determining whether one or more trigger events has been achieved. For instance, received data packets may be parsed to determine whether or not they include an echo command, the time they were received by the client physical machine, the total round trip time to return to the client physical machine, attributes or characteristics of the data packets, or to identify other features of the data packets. The information acquired in response to parsing of the received data packets may be compared to the set of triggering criteria, and the triggering event may be detected in response to achievement of one or more triggering criteria of the set of triggering criteria. As an example, consider a set of queues associated with a triggering criterion of "reception of 100 or more data packets having echo commands within 240 seconds of initial transmission." A set of received data packets may be analyzed, and it may be ascertained that the set of received data packets includes 117 data packets having an echo command which were received within 187 seconds of origination transmission. Accordingly, achievement of the triggering criteria may be achieved, and the triggering event may be detected. Other methods of detecting the triggering event related to the expected return of the set of echo packets are also possible.

At block 280, a wellness indication pertaining to the set of queues of the physical port of the client physical machine may be determined based on a nature of the triggering event. Aspects of the disclosure relate to the recognition that, in some situations, a particular queue of the set of queues may encounter an error, failure, malfunction, or irregularity that impacts data traffic transmission and reception. Accordingly, aspects of the disclosure relate to determining a wellness indication based on a nature of a triggering event detected with respect to return of the set of echo packets. Generally, determining can include resolving, deriving, computing, calculating, formulating, identifying, or otherwise ascertaining the wellness indication pertaining to the set of queues of the physical port of the client physical machine. The wellness indication may include an assessment, report, evaluation, or other appraisal of the health, functionality, or operational status of each individual queue of the set of queues. In embodiments, the wellness indication may include a binary assessment of the operational state of a queue (e.g., functional or non-functional, good or bad, healthy or unhealthy). In embodiments, the wellness indication may include a detailed appraisal of the functionality of each queue of the set of queues. For instance, the wellness indication may indicate a packet loss rate (e.g., 3%), an average data packet transmission frequency (e.g., 100 packets per second), an average buffer time (e.g., 6 seconds), an average data packet round-trip transmission time (e.g., 12 seconds), or other information that characterizes the operational capabilities of each queue of the set of queues. In embodiments, the wellness indication may be based on the nature of the triggering event detected with respect to the expected return of the set of echo packets. For instance, the triggering event may be examined to ascertain information related to the cause of the triggering event, the severity of the triggering event, range/extent of the impact of the triggering event, potential solutions to the trigger event, and the like. Weighting values may be assigned to different factors of the ascertained information, and used to formulate a comprehensive appraisal of the functionality of each queue of the set of queues. In certain embodiments, determining the wellness indication may include analyzing the hash value assigned to each packet of the set of echo packets, and ascertaining whether a threshold number of echo packets (e.g., 50 echo packets) was received from each queue of the set of queues. In response to identifying that no echo packets were received from a particular queue of the set of queues (e.g., based on the hash values of the set of echo packets), a wellness indication may be determined for the particular queue that indicates that it is malfunctioning. Other methods of determining the wellness indication pertaining to the set of queues of the physical port of the client physical machine are also possible.

Consider the following example. A set of 6 queues A, B, C, D, E, and F of a physical port of a client physical machine may be configured to an RSS protocol, such that data traffic may be balanced equally between each of the 6 queues. The client physical machine may transfer a set of echo packets to a server physical machine using a User Datagram Protocol via the set of 6 queues. In embodiments, the set of echo packets may be configured to include a hash value (e.g., computed by a hash function based on a client port number) that indicates which queue of the set of queues they were transmitted by (e.g., a first echo packet was transmitted by Queue A, a second echo packet was transmitted by Queue B). In embodiments, the server physical machine may be configured to receive the set of echo packets, and configure them for retransmission back to the client physical machine. For instance, in embodiments, the server physical machine may be configured to exchange the source address and destination address of each packet of the set of echo packets such that the set of echo packets may be routed back to the network address corresponding to the client physical machine. As described herein, the client physical machine may be configured to monitor the set of queues using a network data traffic diagnostic tool in order to ascertain whether one or more echo packets of the set of echo packets have been received. In embodiments, a triggering event may be detected in relation to the expected return of the set of echo packets. For instance, in response to parsing the data packets received by the client physical machine, it may be ascertained that no echo packets corresponding to a particular queue of the set of queues (e.g., Queue D) have been received. Accordingly, as described herein, a wellness indication pertaining to the set of queues may be determined based on the nature of the triggering event. As an example, based on the nature of the triggering event, a wellness indication may be determined that indicates that Queue D of the set of queues is associated with an error event (e.g., as none of the echo packets corresponding to Queue D were received by the client physical machine), and that the other queues of the set of queues (e.g., A, B, C, E, F) are functioning correctly (e.g., as echo packets corresponding to these queues were received). Other methods of determining the wellness indication for the set of queues are also possible.

Method 200 concludes at block 299. As described herein, aspects of method 200 relate to network interface port management pertaining to a set of queues of a physical port of a client physical machine. Aspects of method 200 may provide performance or efficiency benefits with respect to network interface port management. As an example, port health of network devices may be evaluated on a queue-level basis, such that error events may be isolated to individual queues and network data traffic may be re-routed using working queues. Altogether, leveraging packet balancing techniques with respect to network interface port management may be associated with error detection, data traffic communication reliability, and network performance.

Figure 3:
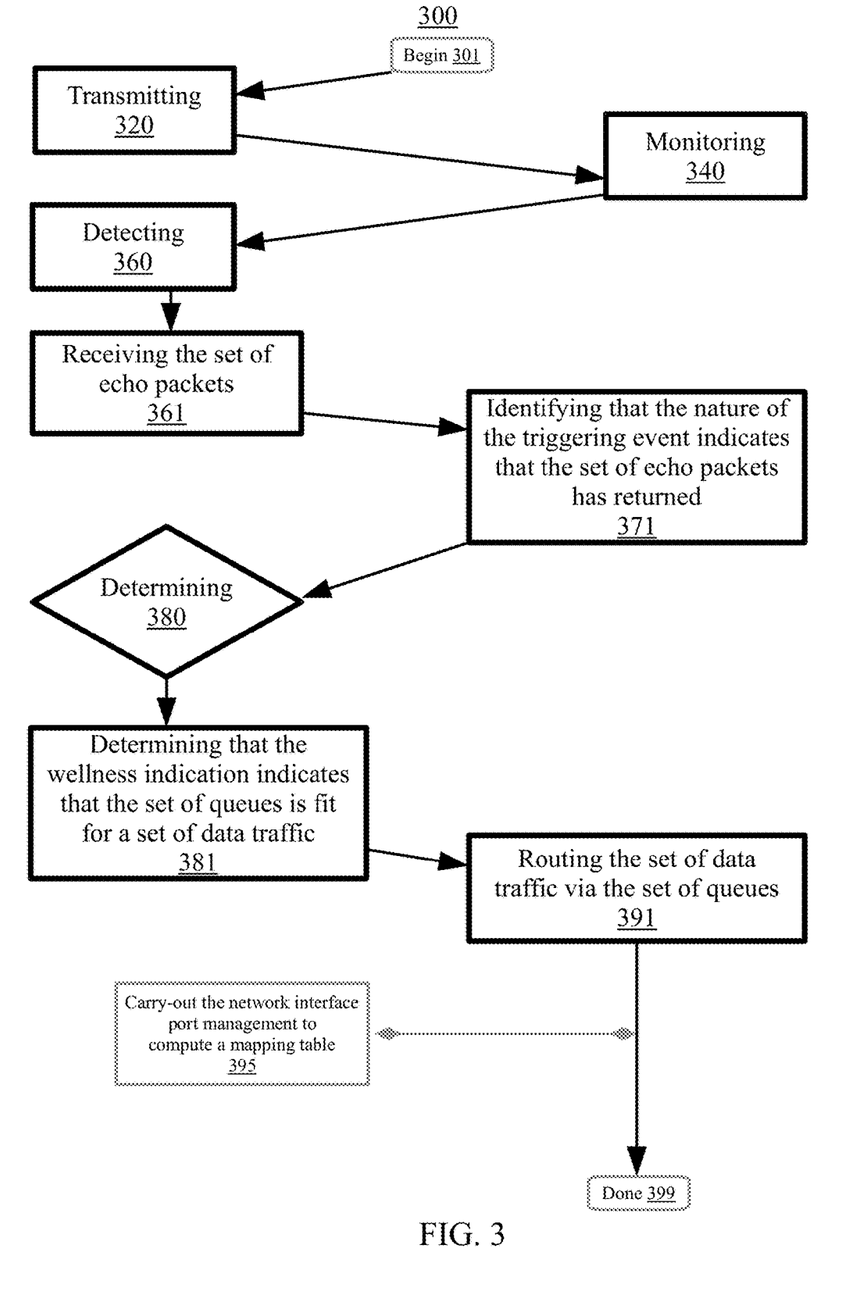
FIG. 3 is a flowchart illustrating a method of network interface port management pertaining to a set of queues of a physical port of a client physical machine, according to embodiments.

FIG. 3 is a flowchart illustrating a method 300 of network interface port management pertaining to a set of queues of a physical port of a client physical machine. Aspects of method 300 may be similar or the same as aspects of method 200, and aspects may be utilized interchangeably with one or more methodologies described herein. The method 300 may begin at block 301. At block 320, a set of echo packets may be transmitted from the client physical machine to a server physical machine. At block 340, the set of queues of the physical port of the client physical machine may be monitored with respect to an expected return of the set of echo packets. At block 360, a triggering event related to the expected return of the set of echo packets may be detected with respect to the set of queues of the physical port of the client physical machine. At block 380, a wellness indication pertaining to the set of queues of the physical port of the client physical machine may be determined based on a nature of the triggering event.

At block 361, the set of echo packets may be received by the set of queues of the physical port of the client physical machine. Aspects of the disclosure relate to the recognition that, in embodiments, the set of echo packets may be configured to return to the client physical machine (e.g., be re-routed by the server physical machine). Accordingly, the set of queues of the physical port of the client physical machine may be configured to receive the set of echo packets. Generally, receiving can include collecting, detecting, capturing, acquiring, sensing, obtaining, or otherwise accepting delivery of the set of echo packets. In embodiments, receiving the set of echo packets may include utilizing a data traffic input interface to collect the set of echo packets transmitted to the network address corresponding to the client physical machine. In embodiments, receiving may include verifying (e.g., via a TCP-based communication connection) that the set of echo packets were re-routed to the client physical machine by the server physical machine, and subsequently accepting delivery of the set of echo packets by the set of queues of the physical port of the client physical machine. Other methods of receiving the set of echo packets are also possible.

At block 371, it may be identified that the nature of the triggering event indicates that the set of echo packets has returned. The identifying may occur with respect to the set of queues of the physical port of the client physical machine. Generally, identifying can include detecting, discovering, recognizing, sensing, or otherwise ascertaining that the nature of the triggering event indicates that the set of echo packets has returned. In embodiments, identifying may include analyzing the triggering event, and ascertaining that the nature (e.g., result, triggering condition, outcome) of the triggering event demonstrates, signifies, represents, or otherwise expresses that the set of echo packets have returned to the physical port of the client physical machine. Consider the following example. A set of queues of the physical port of the client physical machine may be associated with a triggering event of "reception of at least 300 echo packets within 3 minutes of initial transmission." Accordingly, the outcome of the triggering event (e.g., echo packet return status after 3 minutes have passed from initial transmission) may be analyzed, and it may be determined that 391 echo packets were received within 141 seconds of initial transmission. As such, it may be identified that the nature of the triggering event indicates that the set of echo packets have returned to the client physical machine. Other methods of identifying that the nature of the triggering event indicates that the set of echo packets has returned are also possible.

At block 381, it may be determined that the wellness indication indicates that the set of queues of the physical port of the client physical machine is fit for a set of data traffic. The determining may occur based on the nature of the triggering event indicating that the set of echo packets has returned. Generally, determining can include resolving, concluding, computing, calculating, formulating, identifying, or otherwise ascertaining that the wellness indication indicates that the set of queues of the physical port of the client physical machine is fit (e.g., healthy, ripe, capable of successfully managing) for a set of data traffic. The set of data traffic may include a volume of data or information transferred from one network node to another within a network environment. In embodiments, determining that the set of queues of the physical port of the client physical machine is fit for the set of data traffic may include ascertaining that the set of data traffic may be transferred to and from each queue of the set of queues without data loss or corruption (e.g., less than a threshold). For instance, determining that the set of queues is fit for the set of data traffic may include identifying that the triggering event indicates that the set of echo packets were received within a temporal threshold (e.g., 120 seconds from initial transmission). In certain embodiments, determining that the set of queues is fit for the set of data traffic may include verifying that a threshold number of echo packets (e.g., 100 echo packets, 10 megabytes of echo packets) was received from each queue of the set of queues of the physical port. As an example, a hash value assigned to each packet of the set of echo packets may be analyzed to identify the queue from which each echo packet was transmitted, and it may be determined that at least 30 echo packets were received from each queue of the set of queues (e.g., indicating that each queue is functional or operational). Other methods of determining that the set of queues is fit for the set of data traffic are also possible.

At block 391, the set of data traffic may be routed via the set of queues of the physical port of the client physical machine. The set of traffic may be routed to process the set of data traffic. Generally, routing can include relaying, sending, conveying, conducting, directing, forwarding, transferring, or otherwise transmitting the set of traffic via the set of queues of the physical port. In embodiments, routing the set of traffic may include transmitting the set of data traffic from the client physical machine to another computer node of the network environment via the set of queues of the physical port. For instance, routing may include formatting the set of traffic according to a designated communication protocol (e.g., UDP, TCP), assigning a destination address and a source address to the set of data traffic, and subsequently transmitting the set of data traffic to the destination address over the set of queues. In embodiments, routing may include dividing (e.g., splitting, breaking up) the set of traffic into a plurality of portions, and sending one or more portions over each queue of the set of queues (e.g., for load balancing). Other methods of routing the set of data traffic via the set of queues of the physical port are also possible.

In embodiments, the network interface port management may be carried-out in conjunction with a startup script to compute a mapping table at block 395. Generally, carrying-out can include implementing, running, initiating, completing, instantiating, executing, or otherwise performing the network interface port management in conjunction with the startup script to compute a mapping table. The startup script may include a series of instructions configured for automatic initiation by a compute node in response to undergoing a boot-up sequence. The mapping table may include an index, directory, listing, database, or other data structure that delineates the logical relationships between network components. For instance, the mapping table may indicate which queues of the set of queues should be used to route data to particular compute nodes, how data traffic should be routed/re-routed in the event that a particular queue encounters an error, which queues correspond to what/are configured to transmit which types of data traffic, or the like. In embodiments, computing the mapping table may include examining the physical and logical topology of the network environment, and formulating a topology arrangement that defines which queues should be used to carry particular sets of data traffic to specific destination compute nodes. As an example, the mapping table may indicate that a particular Queue A of the set of queues may be configured to transmit data traffic associated with a particular metadata tag (e.g., indicating association with a particular topic, attribute, or characteristic) from the client physical device to the server physical device. In certain embodiments, the mapping table may define a set of back-up plans, such that, in the event that a particular queue of a physical port encounters an error, one or more of the set of back-up plans may be used to re-route traffic from the malfunctioning queue via another queue. In embodiments, computing the mapping table may include running a hashing algorithm to calculate and assign a hash value to a set of data traffic (e.g., based on a client machine port value) that indicates which queue of the set of queues it may be managed by (e.g., such that the queue that transmitted/received the set of data may be identified). As described herein, the computation of the mapping table may be initiated by a startup-script in response to a system boot-up sequence. Other methods of carrying-out computation of the mapping table in conjunction with a start-up script are also possible. Method 300 concludes at block 399. As described herein, aspects of method 300 relate to network interface port management pertaining to a set of queues of a physical port of a client physical machine. Aspects of method 300 may provide performance or efficiency benefits (e.g., error detection, data traffic communication reliability, and network performance).

Figure 4:
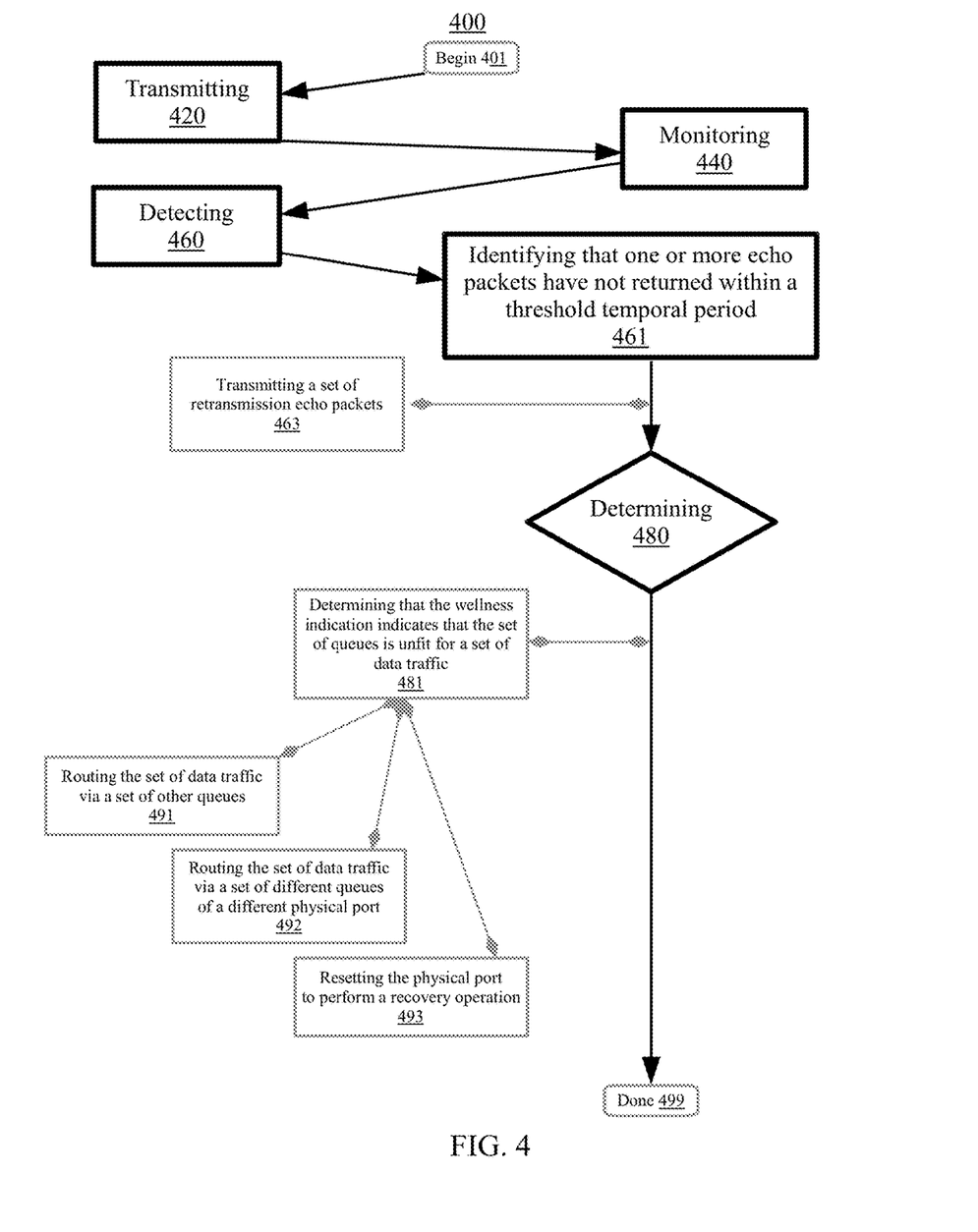
FIG. 4 is a flowchart illustrating a method of network interface port management pertaining to a set of queues of a physical port of a client physical machine, according to embodiments.

FIG. 4 is a flowchart illustrating a method 400 of network interface port management pertaining to a set of queues of a physical port of a client physical machine. Aspects of method 400 may be similar or the same as aspects of method 200/300, and aspects may be utilized interchangeably with one or more methodologies described herein. The method 400 may begin at block 401. At block 420, a set of echo packets may be transmitted from the client physical machine to a server physical machine. At block 440, the set of queues of the physical port of the client physical machine may be monitored with respect to an expected return of the set of echo packets. At block 460, a triggering event related to the expected return of the set of echo packets may be detected with respect to the set of queues of the physical port of the client physical machine. At block 480, a wellness indication pertaining to the set of queues of the physical port of the client physical machine may be determined based on a nature of the triggering event.

At block 461, it may be identified that one or more echo packets of the set of echo packets have not returned within a threshold temporal period. The identifying may occur with respect to the set of queues of the physical port of the client physical machine. Generally, identifying can include detecting, discovering, observing recognizing, resolving, sensing, or otherwise ascertaining that one or more echo packets of the set of echo packets have not returned within a threshold temporal period. In embodiments, identifying may include sensing that a threshold temporal period has elapsed without return of one or more echo packets of the set of echo packets. In certain embodiments, identifying may include analyzing the triggering event related to the expected return of the set of echo packets, and ascertaining that the nature (e.g., result, triggering condition, outcome) of the triggering event demonstrates, signifies, represents, or otherwise expresses that the set of echo packets have not returned to the physical port of the client physical machine. Consider the following example. A set of queues of the physical port of the client physical machine may be associated with a triggering event of "reception of at least 200 echo packets within 120 seconds of initial transmission." Accordingly, elapsing of the specified 120 second temporal period may be detected, and it may be sensed that less than 200 echo packets were received within the 120 second temporal period. As such, it may be identified that one or more echo packets of the set of echo packets have not returned within the threshold temporal period. In embodiments, identifying may include parsing the set of echo packets to analyze a hash value associated with one or more echo packets of the set of echo packets, and determining that an echo packet including a hash value corresponding to a particular queue of the set of queues is not present (e.g., missing, lacking from) in the set of received echo packets. Other methods of identifying that one or more echo packets have not returned within a threshold temporal period are also possible.

In embodiments, a set of retransmission echo packets may be transmitted from the client physical machine to the server physical machine at block 463. Generally, transmitting can include sending, conducting, conveying, directing, relaying, transferring, routing, or otherwise communicating the set of retransmission echo packets from the client physical machine to the server physical machine. The set of retransmission echo packets may include a set of data packets that achieve a similarity threshold (e.g., are similar in content, identical to) with respect to the original set of echo packets. For example, in certain embodiments, the set of retransmission echo packets may include a copy of the original set of echo packets. In embodiments, transmitting the set of retransmission echo packets may include sending the set of retransmission echo packets using the same communication protocol (e.g., UDP or TCP), the same queue type (e.g., RSS or TSS), and the same queue distribution (e.g., the same data packets are transmitted using the same queues) as the original transmission of the set of echo packets. In embodiments, transmitting may include initiating transfer of the set of retransmission echo packets a threshold number of times. As an example, the set of retransmission echo packets may be transmitted from the client physical machine to the server physical machine 3 times. Other methods of transmitting the set of retransmission echo packets are also possible.

In embodiments, it may be determined that the wellness indication indicates that the set of queues of the physical port of the client physical machine is unfit for a set of data traffic at block 481. The determining may occur based on the nature of the triggering event indicating that one or more echo packets of the set of echo packets have not returned within the threshold temporal period. Generally, determining can include resolving, concluding, computing, calculating, formulating, identifying, or otherwise ascertaining that the wellness indication indicates that the set of queues of the physical port of the client physical machine is unfit (e.g., unsuitable, malfunctioning, incapable of successfully managing) for a set of data traffic. In embodiments, determining that the set of queues of the physical port of the client physical machine is unfit for the set of data traffic may include detecting that the transmission of data traffic between the client physical machine and the server physical machine using the set of queues is associated with data loss or corruption (e.g., greater than a threshold). For instance, determining that the set of queues is unfit for the set of data traffic may include identifying that the triggering event indicates that the set of echo packets were not received within a temporal threshold (e.g., no echo packets received within 300 seconds of initial transmission). In certain embodiments, determining that the set of queues is unfit for the set of data traffic may include ascertaining that the number of echo packets received from one or more queues of the set of queues does not achieve a threshold number (e.g., 150 echo packets per queue, 15 megabytes of echo packets per queue). As an example, a hash value associated with each data packet of a set of received data packets may be analyzed to identify the queue from which each packet was transmitted, and it may be determined that less than 5 echo packets were received from a particular queue of the set of queues (e.g., indicating that the queue may be malfunctioning or has failed). Other methods of determining that the set of queues is unfit for the set of data traffic are also possible.

In embodiments, the set of data traffic may be routed via a set of other queues of the physical port of the client physical machine at block 491. The routing may occur to process (e.g., manage, handle) the set of data traffic. Generally, routing can include relaying, sending, conveying, conducting, directing, forwarding, transferring, or otherwise transmitting the set of traffic via a set of other queues of the physical port of the client physical machine. The set of other queues of the physical port may include queues that are separate/different from those that were determined to be unfit to manage the set of data traffic. In embodiments, the set of other queues may include queues that have been verified to be fit to manage the set of traffic (e.g., echo packets sent using the set of other queues were successfully returned via the server physical device). In embodiments, routing the set of data traffic may include redistributing the set of data traffic to balance data loads among the set of other queues of the physical port, and subsequently transferring the set of data traffic to a destination computing node using the set of other queues. As an example, consider a situation in which a physical port of the client physical machine has 6 queues A, B, C, D, E, and F. In response to determining that queues A, C, and F, are unfit for the set of traffic, the client physical machine may be configured to reassign the set of traffic to queues B, D, and E for management. Other methods of routing the set of data traffic via the set of other queues of the physical port of the client physical machine are also possible.

In embodiments, the set of data traffic may be routed via a set of different queues of a different physical port of the client physical machine at block 492. The routing may occur to process the set of data traffic. Generally, routing can include relaying, sending, conveying, conducting, directing, forwarding, transferring, or otherwise transmitting the set of traffic via a set of different queues (e.g., second set of queues) of a different physical port (e.g., second physical port) of the client physical machine. The set of different queues may include a second set of queues verified to be fit for traffic management that are located on a separate physical port of the client physical machine. In embodiments, the second set of queues and the first set of queues may be mutually exclusive (e.g., no overlap; no queue may be simultaneously included in both the second and first sets of queues). In embodiments, routing may include directing the entire set of data traffic from the first set of queues to the second set of queues such that all data traffic is shifted from the first physical port to the second (e.g., different) physical port of the client physical machine. In embodiments, routing may include maintaining a first portion of the set of data traffic on a subset of the first set of queues (e.g., queues that are verified to be working correctly), and shifting a second portion of the set of data traffic to the second set of queues.

Consider the following example. A client physical port may include a first physical port having a first set of 8 queues 1, 2, 3, 4, 5, 6, 7, and 8, and a second physical port having a second set of 8 queues A, B, C, D, E, F, G, and H. As described herein, a wellness indication pertaining to both the first set of queues and the second set of queues may be determined, and it may be identified that queues 5 and 8 are unfit for management of data traffic (e.g., no echo packets transmitted by queues 5 and 8 were identified in the set of returning data packets). Accordingly, routing the set of traffic may include maintaining a first portion of the set of data traffic on a subset of the first set of queues (e.g., as these queues remain fit for handling data), and re-routing a second portion of the set of data traffic to the second set of queues. For instance, in embodiments, data traffic may be maintained on queues 1-4 and 6-7, and a portion of data traffic (e.g., corresponding to queues 5 and 8) may be routed to the second set of queues (e.g., queues E and H). As such, data traffic may be managed at a queue-level to promote communication efficiency in the computer networking environment. Other methods of routing the set of data traffic via a set of different queues of a different physical port of the client physical machine are also possible.

In embodiments, the physical port of the client physical machine may be reset to perform a recovery operation at block 493. Aspects of the disclosure relate to the recognition that, in some situations, one or more queues may be associated with a temporary error or behavioral irregularity such that resetting the physical port may resolve the issue and return the queue to an operational state. Generally, resetting can include rebooting, power-cycling, reloading, or otherwise restarting the physical port of the client physical machine. The recovery operation may include a process, procedure, or action configured to resolve, fix, stabilize, or mitigate an error, bug, failure, or irregularity encountered by one or more queues of the physical port. In embodiments, resetting the physical port may include shutting down (e.g., removing power from) the physical port and subsequently booting it a second time. In certain embodiments, resetting the physical port may include clearing (e.g., emptying, freeing, opening) the physical port of all network traffic for a threshold period of time (e.g., 5 minutes, 1 hour, 24 hours) and subsequently re-evaluating the operational status of the physical port. Other methods of resetting the physical port of the client physical machine are also possible. Method 400 concludes at block 499. As described herein, aspects of method 400 relate to network interface port management pertaining to a set of queues of a physical port of a client physical machine. Aspects of method 400 may provide performance or efficiency benefits (e.g., error detection, data traffic communication reliability, and network performance).

Figure 5:
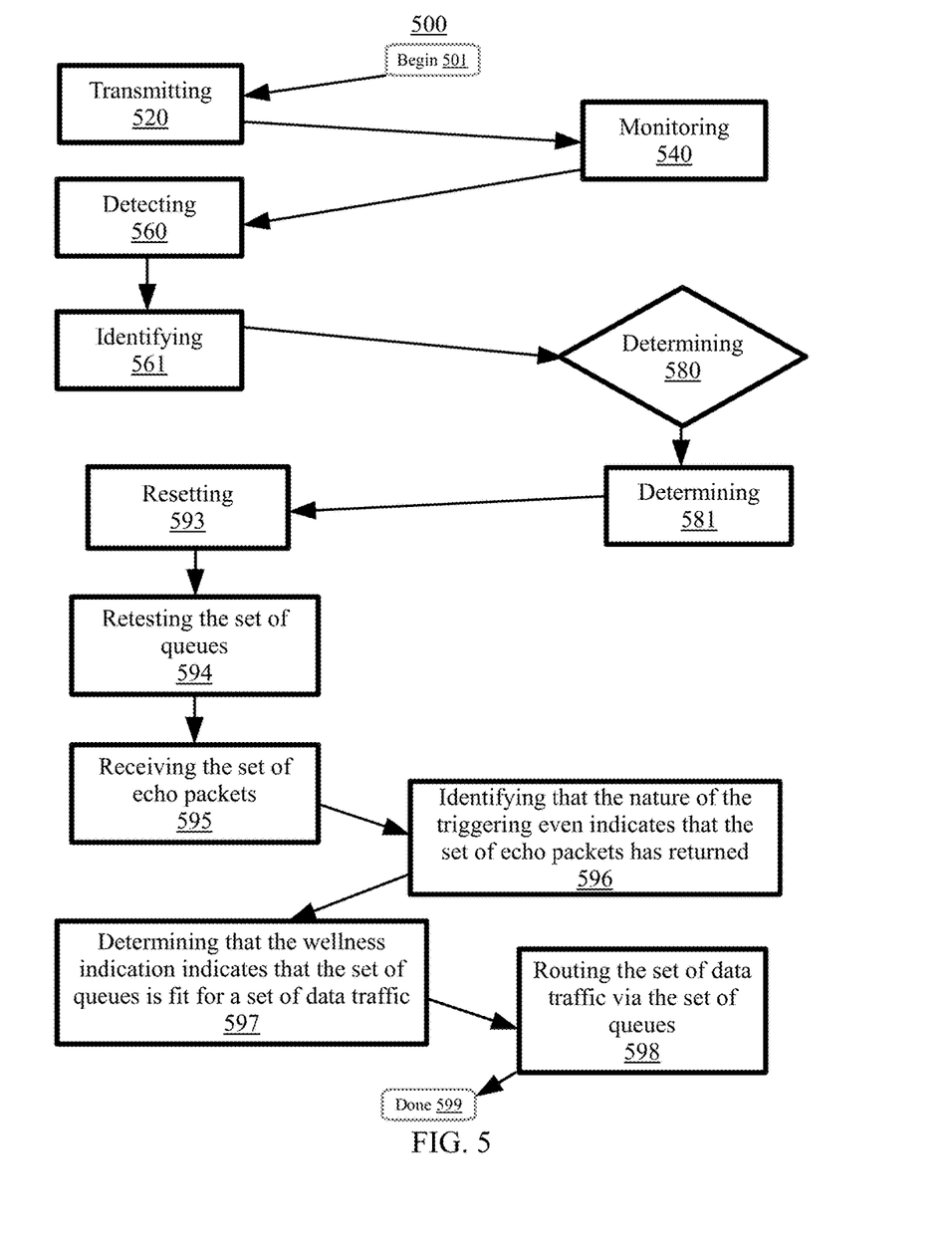
FIG. 5 is a flowchart illustrating a method of network interface port management pertaining to a set of queues of a physical port of a client physical machine, according to embodiments.

FIG. 5 is a flowchart illustrating a method 500 of network interface port management pertaining to a set of queues of a physical port of a client physical machine. Aspects of method 500 may be similar or the same as aspects of method 200/300/400, and aspects may be utilized interchangeably with one or more methodologies described herein. The method 500 may begin at block 501. At block 520, a set of echo packets may be transmitted from the client physical machine to a server physical machine. At block 540, the set of queues of the physical port of the client physical machine may be monitored with respect to an expected return of the set of echo packets. At block 560, a triggering event related to the expected return of the set of echo packets may be detected with respect to the set of queues of the physical port of the client physical machine. At block 561, it may be identified that one or more echo packets of the set of echo packets have not returned within a threshold temporal period. The identifying may occur with respect to the set of queues of the physical port of the client physical machine. At block 580, a wellness indication pertaining to the set of queues of the physical port of the client physical machine may be determined based on a nature of the triggering event. At block 581, it may be determined that the wellness indication indicates that the set of queues of the physical port of the client physical machine is unfit for a set of data traffic. The determining may occur based on the nature of the triggering event indicating that one or more echo packets of the set of echo packets have not returned within the threshold temporal period. At block 593, the physical port of the client physical machine may be reset to perform a recovery operation.

At block 594, the set of queues of the physical port of the client physical machine may be retested to perform the recovery operation. Generally, retesting can include re-examining, re-appraising, or otherwise re-evaluating the set of queues of the physical port of the client physical machine. In embodiments, retesting can include verifying the operational status (e.g., fitness or unfitness) of one or more queues to manage a set of data. For instance, retesting may include transmitting a second set of echo packets to the server physical machine using the set of queues in order to ascertain whether the set of queues are suitable for data traffic transmission and reception. At block 595, the set of echo packets may be received (e.g., collected, detected, captured, acquired, sensed, obtained) by the set of queues of the physical port of the client physical machine in response to the resetting and retesting. In embodiments, receiving the set of echo packets may include accepting delivery of the set of echo packets from the server physical machine. At block 596, it may be identified (e.g., detected, discovered, recognized, sensed, ascertained) that the nature of the triggering event indicates that the set of echo packets has returned in response to the resetting and the retesting. The identifying may occur with respect to the set of queues of the physical port of the client physical machine. In embodiments, identifying that the set of echo packets has returned may include analyzing the triggering event, and ascertaining that the nature (e.g., result, triggering condition, outcome) of the triggering event demonstrates, signifies, represents, or otherwise expresses that the set of echo packets have returned to the physical port of the client physical machine. For instance, in embodiments, the triggering event may indicate that a threshold number of echo data packets was received from each queue of the set of queues (e.g., as indicated by a hash value associated with each echo data packet).

At block 597, it may be determined (e.g., resolved, concluded, computed, calculated, formulated, identified, ascertained) that the set of queues of the physical port of the client physical machine is fit for a set of data traffic. The determining may occur based on the nature of the triggering event indicating that the set of echo packets has returned in response to the resetting and the retesting. In embodiments, determining may include ascertaining that the set of data traffic may be transferred to and from each queue of the set of queues without data loss or corruption (e.g., greater than a threshold). At block 598, the set of data traffic may be routed (e.g., relayed, sent, conveyed, conducted, directed, forwarded, transferred, transmitted) via the set of queues of the physical port of the client physical machine. The routing may occur to process the set of traffic. In embodiments, routing may include transmitting the set of data traffic from the client physical machine to another computer node of the network environment via the set of queues of the physical port. As such, in certain embodiments, the set of queues of the physical port may be restored to a functional state in response to performance of the recovery operation. Other methods of performing the recovery operation are also possible. Method 500 concludes at block 599. As described herein, aspects of method 500 relate to network interface port management pertaining to a set of queues of a physical port of a client physical machine. Aspects of method 500 may provide performance or efficiency benefits (e.g., error detection, data traffic communication reliability, and network performance).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A system comprising:
a processor; and
a memory in communication with the processor, the memory containing program instructions that, when executed by the processor, are configured to cause the processor to perform a method, the method comprising:
generating, by a processor, a first set of hash values for a first set of echo packets, wherein each hash value in the first set of hash values corresponds to a queue in a first set of queues on a first physical port;
transmitting, by the processor, the first set of echo packets and the first set of hash values from the first set of queues to a server machine;
receiving, by the processor, a first subset of the first set of echo packets and a first subset of the first set of hash values from the server machine;
generating, by the processor, a second set of hash values for a second set of echo packets, wherein each hash value in the second set of hash values corresponds to a queue in a second set of queues on a second physical port;
transmitting, by the processor, the second set of echo packets and the second set of hash values from the second set of queues to the server machine;
receiving, by the processor, a second subset of the second set of echo packets and a second subset of the second set of hash values from the server machine;
comparing, by the processor, the first subset of the first set of echo packets to the first set of echo packets;
determining, by the processor and based on the comparing the first subset of the first set of echo packets to the first set of echo packets, that a first number of echo packets in the first subset is below a wellness threshold;
retransmitting, by the processor and based on the determining that the first number is below the wellness threshold, the first set of echo packets and the first set of hash values from the first set of queues to the server machine;
comparing, by the processor, the second subset of the second set of echo packets to the second set of echo packets;
determining, by the processor and based on the comparing the second subset of the second set of echo packets to the second set of echo packets, that a second number of echo packets in the second subset is above the wellness threshold;
concluding, by the processor and based on the determining that the second number is above the wellness threshold, that the second physical port is fit for transmitting a set of data to the server machine;
receiving, by the processor, a third subset of the first set of echo packets and a third subset of the first set of hash values from the server machine;
comparing, by the processor, the third subset of the first set of echo packets to the first set of echo packets;
determining, by the processor and based on the comparing the third subset of the first set of echo packets to the first set of echo packets, that a third number of echo packets in the third subset is below the wellness threshold;
concluding, based on the determining that the third number is below the wellness threshold, that the first physical port is unfit for transmitting the set of data to the server machine;
cross referencing, by the processor and based on the concluding that the first physical port is unfit and the concluding that the second physical port is fit, the second subset of hash values and the second set of queues in the second physical port;
identifying, by the processor and based on the cross-referencing, a subset of queues that corresponds to the second subset of hash values; and
transmitting, by the processor and based on the identifying, the set of data from the subset of queues to the server machine.

* * * * *